(12) United States Patent
Loughney et al.

(10) Patent No.: US 10,731,278 B2
(45) Date of Patent: Aug. 4, 2020

(54) PILE WEATHERSTRIPPING AND OTHER PILE AND BRUSH ARTICLES HAVING PILES OR BRUSHES EXCLUSIVELY OF POLYAMIDE (NYLON) REACTIVELY BONDED TO AN UNLIKE PLASTIC MATERIAL ESPECIALLY POLYPROPYLENE

(76) Inventors: David M. Loughney, Phelps, NY (US); John F. Scherlein, Fairport, NY (US); Akira Chanthabandith, Henrietta, NY (US)

( * ) Notice: Subject to any disclaimer, the term of this patent is extended or adjusted under 35 U.S.C. 154(b) by 267 days.

(21) Appl. No.: 13/883,384

(22) PCT Filed: Nov. 3, 2011

(86) PCT No.: PCT/US2011/001851
§ 371 (c)(1),
(2), (4) Date: May 3, 2013

(87) PCT Pub. No.: WO2012/060876
PCT Pub. Date: May 10, 2012

(65) Prior Publication Data
US 2013/0236684 A1     Sep. 12, 2013

Related U.S. Application Data

(60) Provisional application No. 61/456,240, filed on Nov. 3, 2010.

(51) Int. Cl.
*D03D 27/00* (2006.01)
*B29C 65/08* (2006.01)
(Continued)

(52) U.S. Cl.
CPC ............. *D03D 27/00* (2013.01); *B29C 65/08* (2013.01); *B29C 65/4815* (2013.01);
(Continued)

(58) Field of Classification Search
CPC ... E06B 7/22; E06B 7/16; B29C 66/71; B29C 66/712; B29C 66/72; B29C 66/69;
(Continued)

(56) References Cited

U.S. PATENT DOCUMENTS

| 3,677,851 A | 7/1972 | Kayser | |
| 3,843,760 A * | 10/1974 | Teed | B05D 1/265 |
| | | | 264/171.23 |

(Continued)

FOREIGN PATENT DOCUMENTS

| CA | 2 198 597 | 3/1996 |
| GB | 1 475 077 | 6/1977 |

(Continued)

OTHER PUBLICATIONS

AZoM, "Adhesion Between Polymers and Other Substances—A Review of Bonding Mechanisms, Systems and Testing," Jul. 23, 2003, http://www.azom.com/article.aspx?ArticleID=2089.*

(Continued)

*Primary Examiner* — Cheryl Juska
(74) *Attorney, Agent, or Firm* — Kenneth J. Lukacher Law Group

(57) ABSTRACT

Pile articles (20,22), especially pile weatherstripping, and a method and apparatus (10) for making such articles where the backing (24) and the pile (26) are of unlike material, especially nylon yarn for the pile (26) and polypropylene containing material for the backing (24), wherein prior to the welding of the pile (26) to the backing (24) the pile is first pre-heated using ultrasonic energy to melt the pile in a region (65) thereof where the pile is ultrasonically welded to the backing and before the weld is made. The ultrasonic melting occurs upstream of the location where the pile (26) is welded to the backing (24) so that the ultrasonically pre-heated melted region (65) of the pile (26) can cool and (Continued)

become at least partially solidified. Then pile (26) at the pre-heated melted region (65) is welded to the backing (24) and causes a reactive or chemical weld to occur, thereby attaching the pile (26) to the backing (24).

9 Claims, 3 Drawing Sheets

(51) Int. Cl.
| | | |
|---|---|---|
| B29C 65/78 | (2006.01) | |
| B29C 65/00 | (2006.01) | |
| B29C 65/48 | (2006.01) | |
| D04H 11/00 | (2006.01) | |
| E06B 7/22 | (2006.01) | |
| B29C 65/50 | (2006.01) | |
| E06B 7/16 | (2006.01) | |

(52) U.S. Cl.
CPC ...... *B29C 65/5021* (2013.01); *B29C 65/7894* (2013.01); *B29C 66/0242* (2013.01); *B29C 66/0326* (2013.01); *B29C 66/69* (2013.01); *B29C 66/712* (2013.01); *B29C 66/72* (2013.01); *B29C 66/81431* (2013.01); *B29C 66/836* (2013.01); *B29C 66/843* (2013.01); *D04H 11/00* (2013.01); *E06B 7/16* (2013.01); *E06B 7/22* (2013.01); *B29C 66/1122* (2013.01); *B29C 66/474* (2013.01); *B29C 66/5326* (2013.01); *B29C 66/63* (2013.01); *B29C 66/71* (2013.01); *B29C 66/81463* (2013.01); *Y10T 156/12* (2015.01); *Y10T 428/23979* (2015.04); *Y10T 428/23993* (2015.04)

(58) Field of Classification Search
CPC . B29C 66/0242; B29C 65/7894; B29C 65/08; Y10T 428/23979; Y10T 428/23993; Y10T 156/12
USPC ...................................... 428/95, 97
See application file for complete search history.

(56) References Cited

U.S. PATENT DOCUMENTS

| | | | |
|---|---|---|---|
| 4,148,953 A | 4/1979 | Horton | |
| 4,302,494 A | 11/1981 | Horton | |
| 4,970,829 A | 11/1990 | Brautigam | |
| 5,060,422 A | 10/1991 | Horton | |
| 5,093,181 A | 3/1992 | Sanchez | |
| 5,338,382 A | 8/1994 | Johnson et al. | |
| 5,435,863 A * | 7/1995 | Frantz | B06B 1/0246 156/358 |
| 5,807,451 A | 9/1998 | Johnson | |
| 5,817,390 A | 10/1998 | Johnson | |
| 5,817,414 A * | 10/1998 | Ando | B60J 10/17 156/245 |
| 5,846,377 A | 12/1998 | Frantz et al. | |
| 5,906,877 A * | 5/1999 | Popper | B29C 65/086 428/370 |
| 6,115,566 A | 9/2000 | Ohara et al. | |
| 6,341,449 B1 * | 1/2002 | Stahl | E06B 3/44 49/458 |
| 6,773,527 B2 * | 8/2004 | Campbell | B29C 65/087 156/580.1 |
| 7,718,251 B2 * | 5/2010 | Huntress | B29C 44/326 156/153 |
| 2003/0188819 A1 | 10/2003 | Campbell et al. | |
| 2004/0074719 A1 * | 4/2004 | Loughney | E06B 7/22 188/267.1 |
| 2005/0129905 A1 | 6/2005 | Veenema et al. | |
| 2008/0093007 A1 | 4/2008 | Wylie et al. | |
| 2008/0206583 A1 * | 8/2008 | Phan | B32B 7/12 428/523 |
| 2008/0233336 A1 * | 9/2008 | Giannopoulos | D06N 7/0081 428/95 |
| 2009/0078377 A1 * | 3/2009 | Ohara | E06B 9/582 160/127 |
| 2009/0258184 A1 | 10/2009 | Pawson et al. | |
| 2009/0322144 A1 * | 12/2009 | Chanthabane | A46D 3/06 300/21 |
| 2010/0136317 A1 * | 6/2010 | Huntress | B29C 44/326 428/304.4 |
| 2010/0170160 A1 * | 7/2010 | Albanese | E06B 7/2307 49/489.1 |
| 2010/0252168 A1 * | 10/2010 | Pawson | B29C 48/15 156/72 |
| 2011/0131887 A1 * | 6/2011 | Henry | E06B 7/22 49/493.1 |

FOREIGN PATENT DOCUMENTS

| | | |
|---|---|---|
| JP | 58162683 | 9/1983 |
| WO | 2006/065284 | 6/2006 |

OTHER PUBLICATIONS

Lee, I.H., "Bonding 'Unjoinable' Polymers," DuPont Packaging & Industrial Polymers, 2011.*
"Polymers: Characteristics and Compatibility for Ultrasonic Assembly," Technical Information, Ultrasonic Welding, Branson Ultrasonics Corporation, 1999.*

* cited by examiner

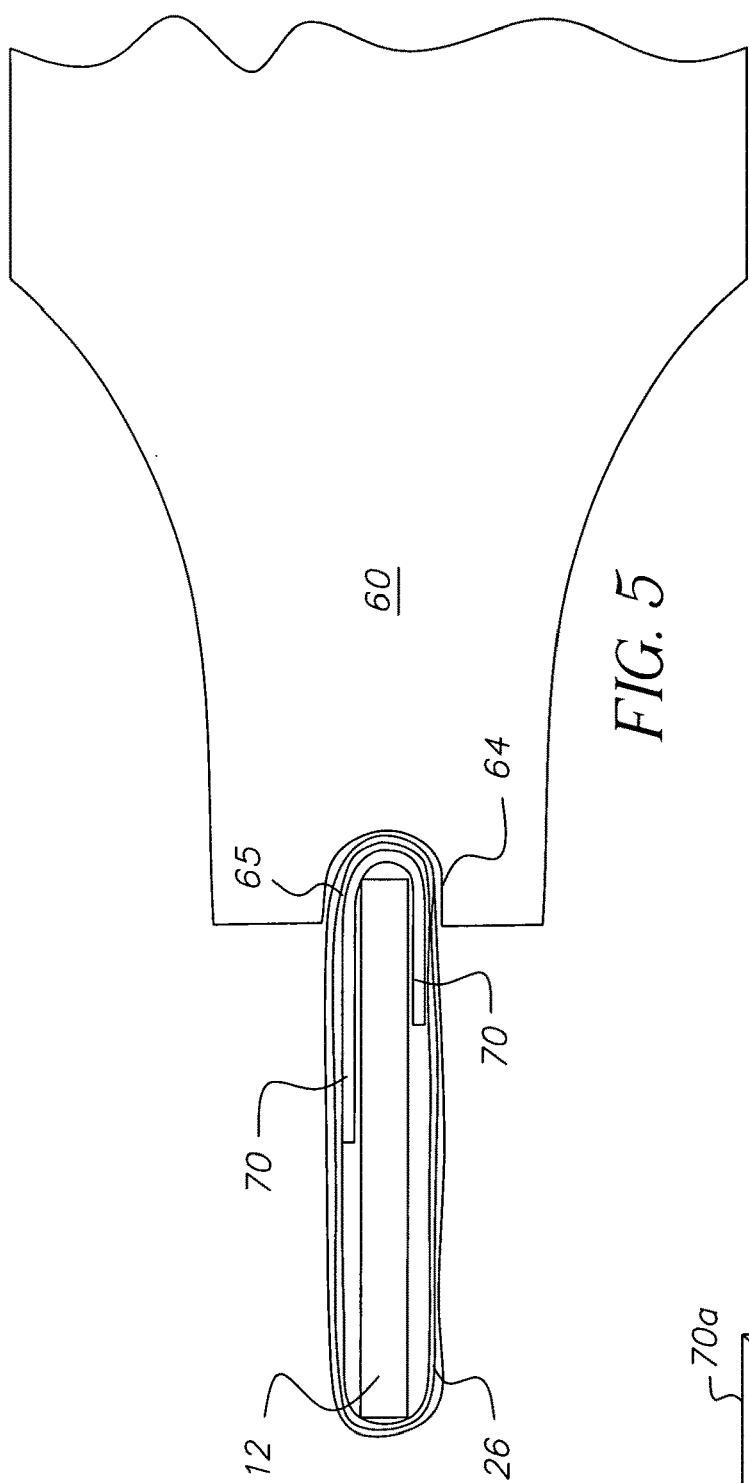
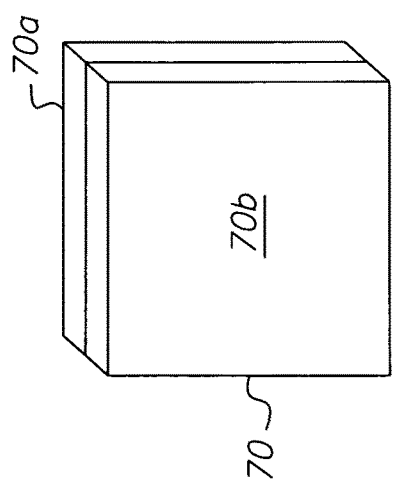
FIG. 5
FIG. 4

PILE WEATHERSTRIPPING AND OTHER PILE AND BRUSH ARTICLES HAVING PILES OR BRUSHES EXCLUSIVELY OF POLYAMIDE (NYLON) REACTIVELY BONDED TO AN UNLIKE PLASTIC MATERIAL ESPECIALLY POLYPROPYLENE

This application claims the benefit of priority to U.S. Provisional Patent Application No. 61/456,240, filed Nov. 3, 2010, which is herein incorporated by reference.

FIELD OF THE INVENTION

The present invention relates to pile weatherstripping and other articles made of a pile of filamentary material, hereinafter referred to as yarn, on a support providing a base or backing of material unlike the yarn and especially a pile exclusively of nylon yarn on a backing which contains polypropylene and having a reactive bond between the backing and the yarn provided by an ultrasonic weld. The invention includes method and apparatus for making such weatherstripping and other articles.

BACKGROUND OF THE INVENTION

Heretofore, pile weatherstripping has been made in large quantities (thousands of feet of weatherstripping per anum) using a process initially developed by Robert Horton (see Horton, U.S. Pat. No. 4,148,953, issued Apr. 10, 1979) where the yarn is helically wound on a traveling band or mandrel, and a backing member of plastic material like the material of the yarn is ultrasonically welded to the yarn along an edge thereof while the yarn and the mandrel move together. The like materials of the yarn and the backing are polypropylene which forms a reactive weld when ultrasonic energy is applied thereto. The following patents also describe the fabrication of pile weatherstripping and also show methods and apparatus for incorporating air and water filtration barrier fins in or along the sides of the pile: Horton, U.S. Pat. No. 4,302,494, issued Nov. 24, 1981; Horton, U.S. Pat. No. 5,060,422, issued Oct. 29, 1991; Johnson et al., U.S. Pat. No. 5,338,382, issued Aug. 16, 1994; Johnson, U.S. Pat. No. 5,817,390, issued Oct. 6, 1998; and Johnson U.S. Pat. No. 5,807,451, issued Sep. 15, 1998. (The patents cited in this paragraph are referenced hereinafter as the "Horton and Johnson patents").

It is especially desirable to use nylon for the pile of the weatherstripping because of its wear characteristics and of the ability to absorb crush force as may be applied on the weatherstripping by fenestration products (doors and windows) in which the weatherstripping is installed when such products are forcibly closed. A reactive bond capable of withstanding such forces is especially desirable. It is also desirable to utilize polypropylene in the backing inasmuch as polypropylene is a lower cost material than nylon and provides a competitive advantage in the marketing of the weatherstripping over weatherstripping made entirely of nylon.

It has been proposed to extrude the backing around the yarn thereby providing a mechanical connection there between, as opposed to a reactive or chemical bond. An extrusion attachment is described in U.S. Pat. No. 5,093,181 to Sanchez, issued Mar. 3, 1992. Interleaved filaments of nylon and polypropylene have also been proposed for providing the pile. Such mixed yarns are mechanically bonded when welded causing the polypropylene to melt and capture the nylon, especially where the polypropylene/nylon yarn is encapsulated in polypropylene to provide the backing for the yarn. Such piles of unlike plastics (Mylar and polypropylene) have been proposed in Ohara et al., U.S. Pat. No. 6,115,566, issued Sep. 5, 2000 and Pawson et al., U.S. Patent Application Publication No. 2009/0258184, published Oct. 15, 2009.

SUMMARY OF THE INVENTION

It is a feature of the present invention to provide pile articles, and a method and apparatus for making pile articles having piles and backings which support the pile of unlike plastic materials, especially piles of a polyamide (e.g., nylon) and backings containing polypropylene (e.g., backing is of polypropylene material, or a composite of materials one of which is polypropylene), where a reactive chemical bond is provided between piles and backings utilizing ultrasonic welding in the manner similar to that of the above-referenced Horton and Johnson patents.

Briefly described, the invention provides pile articles, especially pile weatherstripping and a method and apparatus for making such articles where the backing and the pile are of unlike material, especially nylon yarn for the pile and polypropylene containing material for the backing, wherein prior to the welding of the yarn of the pile to the backing, the yarn is first pre-heated using ultrasonic energy to melt an area or region thereof where the yarn is to be ultrasonically welded to the backing. The ultrasonic pre-heating occurs upstream of the location where the yarn is welded to the backing so that the melted region of the yarn can cool and become substantially (or at least partially) solidified. The pre-heated melted nylon of the yarn is then welded to the backing and causes a reactive or chemical weld (or bond) to occur.

Preferably, the backing is a composite of polypropylene and a polyolefin material which is sold under the trade name Plexar (Plexar is an anhydride modified PP typical of suitable tie-layer resins which may be suitable for use in carrying out aspects of the invention) by Equistar Chemicals of Houston, Tex., USA. It is believed that the Plexar polypropylene mixture, which may be 50% Plexar and polypropylene each by weight, is extruded to make the backing. The mixture may be of other percentages of such materials, if desired. It is believed that the reactive bond is a cross-link polymer bond which provides a strong bond. The ultrasonic welding of the backing to the region of the pre-heated, melted and at least partially solidified yarn is achievable using the long-established process of making pile weatherstripping using ultrasonic welding of like yarn and backing material on a traveling band or mandrel, as per the above-identified Horton and Johnson patents. This cross-link bond or weld is capable of withstanding forces, for example in the neighborhood of 40 psi which may occur in the operation of fenestration products equipped with the weatherstripping. If desired, one or more fins may be part of the weatherstripping as in the above-referenced Johnson patents, each of the one or more fins may be made of a polypropylene film or layer, which is heat-bonded to a non-woven nylon layer or flocking, which is deposited on and bonded to the film.

The invention also provides a method for making a pile article having pile and a backing which supports the pile of unlike plastic material. The method has the steps of heating ultrasonically the pile along an edge thereof to melt a region of the pile prior to welding the pile to the backing, cooling the region to at least partially solidify the melted pile prior to welding the pile to the backing, and then welding ultrasonically the backing to the pile at such region to attach the backing to the pile. Two of the pile articles may be made by repeating the above steps along each of the two edges of pile wrapped around a moving mandrel or band, and then slitting the wrapped pile along the top and bottom of the mandrel or band to separate the two pile articles from each other.

Further, a pile article is provided having a backing and pile of polymer material which extends from the backing along one side thereof, where the backing is of a material devoid of the polymer material of the pile, and the backing and the pile were ultrasonically welded to each other along at least a partially solidified melted portion of the pile. In other words, a pile of yarn fused to a backing which supports the pile may be exclusively of a first polymer, where the backing contains a second polymer unlike the first polymer. One or more fins may also extend from the backing with the pile in which the portion of the pile when melted included such one or more fins.

In general, the pile article, of and made using the present invention have a pile of a polyamide material, such as nylon yarn, attached by fusing the pile to a backing of a polymer material. Preferably, the backing material is unlike that of the polyamide material of the pile in that the polymer material of the backing is or contains a polyolefin, such as polypropylene.

BRIEF DESCRIPTION OF THE DRAWINGS

The foregoing and other features and advantages of the invention will become more apparent from a reading of the following description in connection with the accompanying drawings in which:

FIG. 4 is a fragmentary view of a flocked film strip which may optionally be used to provide a fin inside the pile; and FIG. 5 is a sectional view illustrating the fin strip around the mandrel passing through the groove in one of the pre-heat ultrasonic horns.

DETAILED DESCRIPTION OF THE INVENTION

Figure 1:
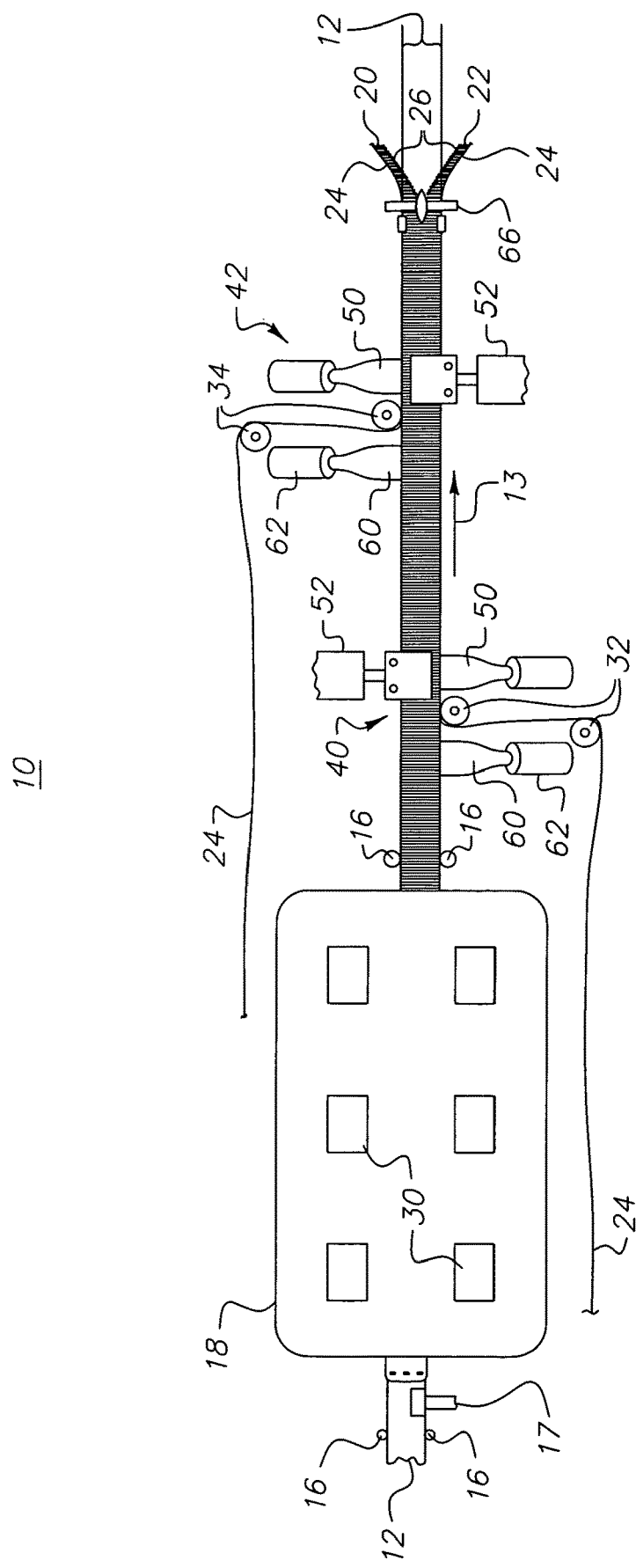
FIG. 1 is a top view schematically showing an apparatus for making pile weatherstripping utilizing the invention.

Referring to FIG. 1, there is shown an apparatus 10 similar to that in the above-referenced Johnson and Johnson et al. patents for manufacturing a pair of pile weatherstrips 20 and 22. Each of the weatherstrips 20 and 22 has a backing of polypropylene blended with Plexar material and extruded into backings 24 from which pile 26 extends. Pile 26 is of polyamide material, preferably nylon yarn. Preferably, the backing may be partially of polypropylene, such as described in more detail later below, but the backing may be entirely or substantially of polypropylene or other non-nylon plastic materials, as desired. The apparatus 10 has a moving band or mandrel 12 of flexible metal guided by rollers 16 along a path in a direction shown by arrow 13. A winding turret 18 has spools 30 of nylon yarn which winds the yarn helically on the band 12 as it moves through the turret in a downstream direction toward the right as shown in FIG. 1 to provide wound pile 26. The turret 18 works in the same way as the winding mechanisms in the above-referenced Horton and Johnson patents.

In order to assure that the band 12 is moving at constant speed, a sensing "piro" unit 17, which has a wheel rotating with the band near the upstream end of the path shown in FIG. 1, provides a signal to the driver mechanism for driving the band continuously. The speed of the band 12 is therefore made constant and may be synchronized with the rotation of the spools 30 in the turret 18 so that the density of the yarn of the pile 26 in terms of denier and filament count of yarns per inch may be selected. A suitable rate for practicing the invention may be with the band 12 moving at 2.95 inches per second so as to provide a denier of 1125 and a filament count per inch of 40. Other rate, denier, or filament cost may be selected as desired.

For pile weatherstrip, pile articles of yarn may be twisted nylon filaments. It will be appreciated, of course, that the pile 26 may be made of nylon monofilaments rather than twisted material. In either case, the term yarn refers to the threads, filaments or twisted threads which are wound on the band 12. The backings 24 are directed from reels in which the strips constituting the backings are wound and are not shown in FIG. 1. The backings 24 are guided by pairs of guide rollers 32 and 34 to ultrasonic welding stations 40 and 42 which are spaced from each other along the path of travel of the band 12. Each station 40 and 42 includes an ultrasonic horn (or head) 50 disposed against first and second fixtures 52, respectively, which are held against the horn and provide backing 24 for the band 12 so as to facilitate welding by the horns 50 of the backings 24 and the wound pile 26 to each other. The operation of the welding stations 40 and 42 is as described in the above-identified Horton and Johnson patents, which are incorporated herein by reference. For example, the horns 50 may be driven by their drivers at approximately 20 kHz and served to melt both the yarn of pile 26 and the backings 24 so as to provide a fused region wherein there is a reactive or chemical bond, which is believed to include chemical cross-linking of the polymers in the backing and in the yarn, even though they are not of like material. After welding stations 40 and 42, the pile 26 is cut from band 12 into separate weatherstrips 20 and 22 by a slitter unit 66 shown at the downstream end of the apparatus in FIG. 1, which provides two wheels with cutting edges disposed above and the other below band 12 to slit pile 26. For example, pile 26 may be of a height of ¼ inch, and ½ inch wide around band 12 until the two weatherstrips 20 and 22 are cut from band 12 by slitter unit 66.

It has been found desirable to provide a composite backing material of PX 6006 anhydride modified polypropylene, which is sold under the trade name Plexar by Equistar Chemicals of Houston, Tex., USA. The PX 6006 and the polymer are separate resins which are mixed, suitably in a 50/50 ratio by weight. The resins of the backing are mixed and fed into an extruder wherein they are extruded into sheets which may be cut into strips providing the backings 24. Polypropylene is thus one of the resins forming the backing material, but other proportions or percentages in the mixture of resins than set forth above may be used, if desired.

Ordinarily the unlike or dissimilar plastic materials, namely polypropylene and nylon will not fuse or weld even if heated ultrasonically by the ultrasonic horns 50 in stations 40 and 42. In other words, the polymers providing the pile and backing do not bond when welded by melting under pressure, which would otherwise be possible if they each were of a common polymer material, such as nylon. According to the present invention, it has been discovered that heating the edges of the yarn pile 26 while wound on the band 20 ultrasonically with pre-heat horns 60, which may be driven by ultrasonic vibrators or drivers 62 at the same rate as the conventional horns 50 (e.g., 20 kHz) along the edges of the band 12 solves this problem. The pre-heating horns 60 fuses the wound yarn pile 26 in region (area or portion) of the yarn pile which will be ultrasonically welded in ultrasonic welding stations 40 and 42 to backings 24. Then, the ultrasonic welding in the stations 40 and 42 provides reactive or chemical bonding between the yarn pile 26 and the backings 24, capable of withstanding forces in opening and closing of windows or otherwise in fenestration products. It is found that the pre-heat horns 60 should be disposed upstream of horns 50 in the stations 40 and 42 by a distance for sufficiently cooling of the yarn pre-heated so as to allow the melted edges along a region of the yarn pre-heated by horns 60 to solidify, at least partially. The distance for cooling depends upon the speed of the band 12 and the density of the yarn as it is wound around the band 12.

Figure 2:
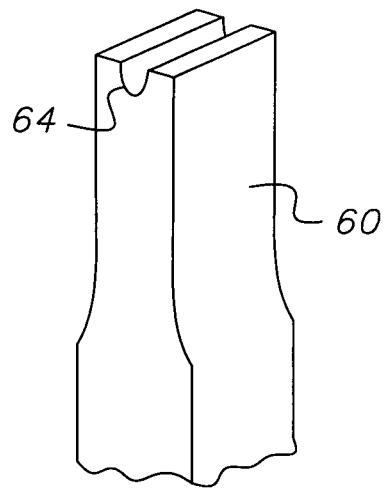
FIG. 2 is a fragmentary perspective view illustrating one of the two pre-heat ultrasonic horns shown in FIG. 1.
Figure 3:
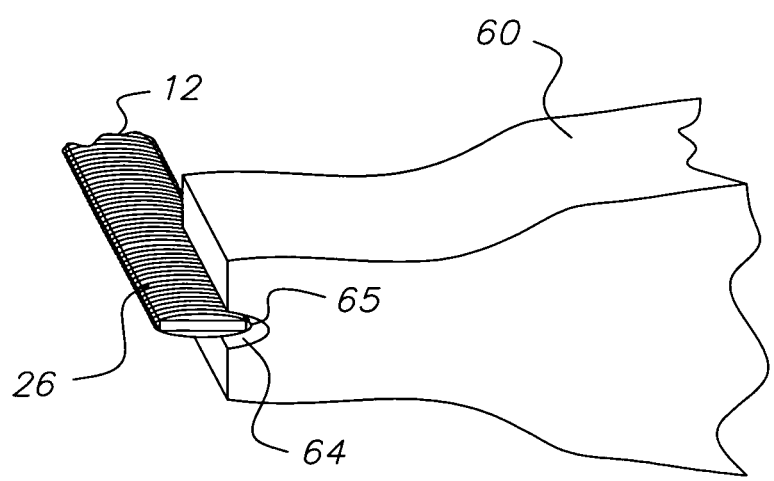
FIG. 3 is a perspective view illustrating one of the pre-heat ultrasonic horns shown in FIG. 1 with the band having the winding of nylon yarn thereon passing through the groove of the pre-heat horn.

As shown in FIGS. 2 and 3, the pre-heat horns 60 are formed with grooves 64 which are sufficiently deep to encompass a region 65 about the edges of the yarn wound around the band 12. The melted and then at least partially solidify pile region 65 represents the portion of the yarn pile 26 which faced groove 64 when passing there through, i.e., region 65 is the yarn wound along one of the two opposite sides about the width of band 12 and extending partially along upon the upper and lower surface of the band according to the depth of groove 64. For example, the groove 64 of each horn may be approximately ⅛ inch in depth, and generally semi-circular at least at the bottom thereof, where pile 26 is of height of ¼ inch, and ½ inch wide around band 12.

It may be desirable to provide a fin 70 in the weatherstrips. Preferably, the fin 70 includes a strip of polypropylene film material (or layer) 70a bonded using heat and a suitable bonding material, such as the Plexar mentioned above, to a flocked or non-woven nylon layer 70b, such as shown in FIG. 4. The nylon layer 70b and the film 70a providing fin 70 are disposed inside the pile 26 wound on the band 12 and are welded both preliminarily by the pre-heat horns 60 and then by horns 50 providing reactive welds between the nylon material of the pile 26, the polypropylene film 70a of fin 70, and the nylon layer 70b of fin 70. The fin's nylon layer 70b along yarn region 65 is pre-heated along with the yarn in grooves 64 of horns 60 and thereby melts and fuses with the yarn, cools to at least partially solidify, and then horns 50 bond the melted fused fin and yarn to the backings 24. Accordingly, a fin 70 having wearability in use in fenestration products like the nylon yarn of the pile 26 is provided. FIG. 5 shows the location of the fin 70 with the flocking thereon in a groove 64 of one of the pre-heat horns 60. For purposes of illustration, FIG. 5 shows an example fin 70 only along one of the two opposite sides of band 12 in pile 26, but the bonded layered materials providing fin may extend (along the top of band 12 shown) to similarly wrap around the other side of the band 12 such that each pile article 20 and 22 when cut has a fin.

When the pile wrapped around the band 12 arrives on the moving band 12 at ultrasonic welding stations 40 and 42, the pile regions melted by horns 60 although cooled may still be at an elevated temperature than if horns 60 were not provided. Horns 50 also melt the yarn of pile 26 at least including (or substantially including) the pile region melted earlier by horns 60 thereby attaching backing 24 by reactively or chemically bonding the pile to the backing. Thus, as melting takes place at both horns 50 and horns 60, then along each side of band 12 its respective horn 60 pre-melts or fuses a region of the pile before such region is further melted or fused at horn 50 when the backing is applied and bonded. The pile 26 of each pile article made, such as weatherstrips 20 and 22, are composed of multiple partial loops of yarn each having a bottom and two sections extending there from to two free ends, respectively, in a direction away from backing 24 along one side of the backing. The improvement over the Horton and Johnson patent is that when unlike polymer (e.g., plastic) materials are used for the pile and backing, the bottom of the loop and a portion of each of its two sections extending there from are welded to the backing at stations 40 and 42 after being pre-heated as described above by horns 60 to enable the desired bonding of the pile and backing, with or without one or more fins. Since the backing has polypropylene, this reduces the overall cost of the pile articles than if the backing were of nylon, as polypropylene is a lower cost material than nylon.

From the foregoing description, it will be apparent that there has been provided methods and apparatus for fabricating weatherstripping and other pile articles, such as brushes, having dissimilar materials in the pile and in the backings (or support or base) of the article. Variations and modifications of the herein described method and apparatus within the scope of the invention will undoubtedly suggest themselves to those skilled in the art. Accordingly, the foregoing description should be taken as illustrative and not in a limiting sense.

What is claimed is:

1. An article for providing a weather seal, comprising:
a pile of filamentary material including filaments that are made from a first polymer, being a nylon;
a backing strip that is devoid of said first polymer, and that is made at least in part from a second polymer, being polypropylene, and wherein
said backing strip being further made from a mixture of said second polymer and a third polymer, said third polymer having a different chemical composition than said second polymer, and wherein said third polymer having properties for cross-linking between said nylon and said polypropylene; and wherein
said pile of filamentary material being attached via a chemical bond to said backing strip by ultrasonic welding of a region of said pile of filamentary material to said backing strip, and wherein
said region of said pile of filamentary material is pre-heated and pre-melted via ultrasonic energy, and later cooled and at least partially solidified, prior to said ultrasonic welding of said region of said pile of filamentary material to said backing strip.

2. The article of claim 1 wherein the article is classified as weather stripping.

3. The article of claim 1 wherein said third polymer is classified as an anhydride modified polypropylene.

4. The article of claim 1 wherein said backing strip is made from about 50% anhydride modified polypropylene and 50% polypropylene, by weight.

5. The article according to claim 1 further comprising one or more fins extending from said backing strip and disposed within said pile.

6. The article of claim 5 wherein said one or more fins are each of a polypropylene film or layer bonded to a non-woven nylon layer or flocking.

7. The article according to claim 1 wherein said pile of filamentary material comprises a plurality of partial loops of yarn, each loop having a bottom and two sections extending there from, and extending towards two free ends, in a direction away from said backing strip.

8. The article of claim 1 wherein a region of said pile of filamentary material that is pre-heated, pre-melted and at least partially solidified, becomes attached to said backing strip upon said ultrasonic welding of said region of said pile of to said backing strip.

9. The article of claim 8 wherein one or more nylon filaments of said pile of filamentary material are attached and extend away from said region of said pile of filamentary material that is attached to said backing strip.

\* \* \* \* \*